United States Patent
Kimura (10) Patent No.: US 6,718,483 B1
(45) Date of Patent: Apr. 6, 2004

(54) FAULT TOLERANT CIRCUIT AND AUTONOMOUS RECOVERING METHOD

(75) Inventor: Tsunekazu Kimura, Tokyo (JP)

(73) Assignee: NEC Corporation, Tokyo (JP)

(*) Notice: Subject to any disclaimer, the term of this patent is extended or adjusted under 35 U.S.C. 154(b) by 458 days.

(21) Appl. No.: 09/621,555

(22) Filed: Jul. 21, 2000

(30) Foreign Application Priority Data

Jul. 22, 1999 (JP) ............................................ 11-207369

(51) Int. Cl.[7] ................................................ G06F 11/00
(52) U.S. Cl. ................................ 714/10; 714/3; 714/11
(58) Field of Search ................................ 714/11, 3, 10

(56) References Cited

U.S. PATENT DOCUMENTS

| | | | | |
|---|---|---|---|---|
| 3,876,987 A | * | 4/1975 | Dalton et al. ................. | 714/10 |
| 4,150,428 A | * | 4/1979 | Inrig et al. ................... | 379/279 |
| 4,323,966 A | * | 4/1982 | Whiteside et al. ............ | 714/1 |
| 4,564,943 A | * | 1/1986 | Collins et al. ................ | 714/745 |
| 4,722,084 A | * | 1/1988 | Morton .......................... | 714/3 |
| 4,868,818 A | * | 9/1989 | Madan et al. .................. | 714/4 |
| 5,553,263 A | * | 9/1996 | Kalish et al. ................. | 711/127 |
| 5,577,050 A | | 11/1996 | Bair et al. ................... | 371/10.2 |
| 5,655,069 A | | 8/1997 | Ogawara et al. | |
| 5,758,132 A | * | 5/1998 | Str.ang.hlin ................. | 713/501 |
| 5,764,828 A | | 6/1998 | Iga et al. ..................... | 385/36 |
| 5,812,757 A | * | 9/1998 | Okamoto et al. ............. | 714/11 |
| 6,067,633 A | * | 5/2000 | Robbins et al. ............... | 714/1 |
| 6,292,905 B1 | * | 9/2001 | Wallach et al. ............... | 714/4 |
| 6,618,825 B1 | * | 9/2003 | Shaw ............................ | 714/55 |

FOREIGN PATENT DOCUMENTS

| | | |
|---|---|---|
| JP | 2-171837 | 7/1990 |
| JP | 8-44581 | 2/1996 |
| JP | 8-255500 | 10/1996 |
| JP | 9-311824 | 12/1997 |
| JP | 10-84275 | 3/1998 |

* cited by examiner

Primary Examiner—Nadeem Iqbal
Assistant Examiner—Michael Maskulinski
(74) Attorney, Agent, or Firm—Foley & Lardner (57) ABSTRACT

A fault tolerant circuit includes a circuit section, a detecting circuit, and a reconstructing circuit. The circuit section has a plurality of circuit sections provided to execute a plurality of functions Each of the plurality of functions has a pre-determined priority. The detecting circuit detects whether or not a part of the plurality of circuit sections is failed. The reconstructing circuit controls a remaining part of the circuit section other than the failed part of the plurality or circuit sections to execute a part of the plurality of functions selected based on the pre-determined priorities when the detecting circuit detects that the part of the plurality of circuit sections is failed.

14 Claims, 9 Drawing Sheets

FAULT TOLERANT CIRCUIT AND AUTONOMOUS RECOVERING METHOD

BACKGROUND OF THE INVENTION

1. Field of the Invention

The present invention relates to a fault tolerant circuit and an autonomous recovering method.

2. Description of the Related Art

A conventional circuit system having a fault tolerance is known. In the conventional circuit system, when any failure has occurred in a part of a plurality of logic gates, a fault circuit block including the failed logic gate is not used or cut down from the circuit system. Thus, the function stop of the whole circuit system is prevented in the conventional circuit system.

Another conventional circuit system having a fault tolerance system is known. Such a conventional circuit system includes a plurality of circuit blocks and redundant circuit blocks. The redundant circuit blocks have the same circuit structures as the circuit blocks. When any failure has occurred in a part of the logic gates, the redundant circuit block corresponding to the failure circuit block including the failed logic gate is used in place of the failed circuit block.

In conjunction with the above description, a microprocessor with an autonomous recovering function is described in Japanese Laid Open patent application (JP-A-Heisei, 2-171837). In this reference, the microprocessor does not have a function-changeable circuit block. This conventional microprocessor does not reproduce a function of troubled circuit blocks. This conventional microprocessor does not have data for reproducing a replica of the troubled circuit blocks. Even if the trouble is induced in this conventional microprocessor, this conventional microprocessor does not reproduce the operation of the troubled circuit blocks.

Japanese Laid Open patent application (J-PA-Heisei, 8-255500) discloses an apparatus and method for recovering an ASIC memory based on the result of testing the ASIC memory. This conventional example includes a test circuit, an autonomous recovery circuit, a memory array and a plurality of redundant lines in the memory array. In the conventional example, the ASIC memory is tested on a chip and recovered based on the rest result. In the recovering step, a method is contained for testing and autonomously recovering the ASIC memory on a chip. An original address position -related to any trouble Is redirected to an address at-least one redundant line is mapped, by using a recovery circuit.

Japanese Laid Open Patent Application (JP-A-Heisei, 9-311824) discloses a built-in autonomous recovery system for an assembly type memory. This conventional example is constituted of a system for attaining an on-chip recovery function using a redundancy circuit in a memory array The conventional autonomous recovery system has a memory array, a recovery circuit, and an on-chip clock generator. The recovery circuit is connected to the memory array. The on-chip clock generator is connected to the recovery circuit. The memory array includes a plurality of I/O memory blocks, a plurality of redundant I/O memory blocks, a plurality of row lines, and a plurality of redundant memory lines. The plurality of row lines intersect the plurality of I/O memory blocks. The plurality of row lines are connected to a plurality of redundant row memory lines. The plurality of I/O memory blocks are connected to a plurality of redundant I/O memory blocks. Also, this recovery circuit recovers a failed row line by use of the redundant row line. Moreover, the recovery circuit recovers a failed I/O memory block by use of the redundant I/O memory block. Also, the on-chip clock generator generates and outputs a trigger signal to the recovery circuit for actuating this recovery circuit.

Japanese Laid Open patent application (JP-A-Heisei, 10-84275) discloses a logic circuit. This conventional logic circuit can attain a fault tolerant property. This conventional logic circuit is provided with a control circuit and a programmable logic cell array. The programmable logic cell array is composed of a plurality of programmable logic cells, which are connected to each other. Each of the plurality of programmable logic cells has an autonomous checking function. When any trouble has occurred in one logic cell, the logic cell transmits a fault occurring signal to the control circuit to indicate that the trouble has occurred in the logic cell itself, independent from another circuit. When the control circuit is received the fault occurring signal, the control circuit stops the sending of a clock signal to the logic cell array, and carries out a reprogramming process of the logic cell array.

SUMMARY OF THE INVENTION

Therefore, an object of the present invention is to provide a fault tolerant circuit and an autonomous recover method, for detecting a fault.

Another object of the present invention Is to provide a fault tolerant circuit and fault tolerant method for detecting a failed portion including the fault tolerant circuit Still another object of the present invention is to provide a fault tolerant circuit and an autonomous recover method, for detecting a failed portion including the fault tolerant circuit and for controlling a remaining portion other than the failed portion to execute a part of functions executed by the fault tolerant circuits.

Still another object of the present invention to to provide a fault tolerant circuit and an autonomous recovery method, for detecting a failed portion including the fault tolerant circuit and for controlling a remaining portion other than the failed portion to execute a part of functions selected based on predetermined priorities.

In order to achieve an aspect of the present invention a fault tolerant circuit including: a circuit section having a plurality of circuit sections provided to execute a plurality of functions, in which each of the plurality of functions has a pre-determined priority level: a detecting circuit detecting whether or not a part of the plurality of circuit sections is failed: and a reconstructing circuit reconstructing a remaining part of the circuit section other than the failed part of the plurality of circuit sections to execute a part of the plurality of functions which is selected based on the pre-determined priority levels when the detecting circuit detects that the part of the plurality of circuit sections is failed.

In the fault tolerant circuits the plurality of circuit sections are electrically connected, and the reconstructing circuit changes the electrical connections between the remaining part of the circuit section other than the failed part of the plurality of circuit sections to execute the part of the plurality of functions selected based on the pre-determined priority levels when the detecting circuit detects that the part of the plurality of circuit sections is failed.

The fault tolerant circuit may further includes a memory storing a plurality of function data and a plurality of segment data, in which each of the plurality of function data corresponds to one of the plurality of functions and each of the plurality of segment data indicates a part of the plurality of circuit sections which are needed for executing the corresponding function, and the reconstructing circuit refers to the memory to retrieve the plurality of function data and the plurality of segment data, when the detecting circuit detects that the part of the plurality of circuit sections is failed, and reconstructs the remaining part of the circuit section other than the failed part of the plurality of circuit sections based on the plurality of retrieved function data and the plurality of retrieved segment data, to execute the part of the plurality of functions which is selected based on the pre-determined priority levels.

In the fault tolerant circuit, each of plurality of circuit sections includes a switching portion for controlling the corresponding circuit section to supply voltage, and the detecting circuit controls the switching portions of the failed part of the plurality of circuit sections to stop supplying the voltage.

In the fault tolerant circuit, each of plurality of circuit sections includes a switching portion for controlling the corresponding circuit section to supply clock signals for operating the corresponding circuit section, and the detecting circuit controls the switching portions of the failed part of the plurality of circuit sections to stop supplying the clock signals.

In the fault tolerant circuit, the detecting circuit electrically separates the failed part of the plurality of circuit sections from a remaining part of the circuit section other than the failed part of the plurality of circuit sections.

The fault tolerant circuit may further includes a memory; and the circuit section stores in the memory a executed function executed by the circuit section when the detecting circuit detects that the part of the plurality of circuit sections is failed, and the circuit section takes the executed function out of the memory and executes the executed function when the reconstructing circuit controls a remaining part of the circuit section other than the failed part of the plurality of circuit sections to execute a part of the plurality of functions selected based on the pre-determined priorities.

In order to achieve another aspect of the present invention, the present invention provides an autonomous recovery method for a fault tolerant circuit including a circuit section having a plurality of circuit segments provided to execute a plurality of functions, including: (a) determining a priority to each of the plurality of functions; (b) detecting whether or not a part of the plurality of circuit sections is failed; and (c) reconstructing a remaining part of the circuit section other than the failed part of the plurality of circuit sections to execute a part of the plurality of functions which is selected based on pre-determined priorities, when the (b) detecting detects that the part of the plurality of circuit sections is failed.

In the autonomous recovery method, the plurality of circuit sections are electrically connected, and the (c) controlling changes the electrical connections between the remaining part of the circuit section other than the failed part of the plurality of circuit sections to execute a part of the plurality of functions selected based on the pre-determined priorities by when the (b) detecting detects that the part of the plurality of circuit sections is failed.

The autonomous recovery method may further includes (d) setting a plurality of segment data corresponding each of the plurality of functions in which each of the plurality of segment data indicates segments needed for executing the corresponding function, and the (c) controlling controls remaining part of the circuit section other than the failed part of the plurality of circuit sections to execute a part of the plurality of functions selected based on the pre-determined priorities referring the plurality of segment data when the detecting circuit detects that the part of the plurality of circuit sections is failed.

In the autonomous recovery method, the each of plurality of circuit sections includes a switching portion for controlling the corresponding circuit section to supply voltage, further including, (e) controlling the switching portions of the failed part of the plurality of circuit sections to stop supplying the voltage.

In the autonomous recovery method, each of plurality of circuit sections includes a switching portion for controlling the corresponding circuit section to supply clock signals for operating the corresponding circuit section, further including, (f) controlling the switching portions of the failed part of the plurality of circuit sections to stop supplying the clock signals.

In the autonomous recovery method, the (c) controlling includes; (g) separating electrically the failed part of the plurality of circuit sections from a remaining part of the circuit section other than the failed part of the plurality of circuit sections.

The autonomous recovery method may further include (h) taking a executed function executed by the circuit section when the (b) detecting detects that the part of the plurality of circuit sections is failed, and (i) executing the executed function by the circuit section after the (c) controlling is executed.

DESCRIPTION OF THE PREFERRED EMBODIMENTS

Referring now to drawings, a fault tolerant circuit according to the present invention will be described.

First, a fault tolerant circuit as an autonomous recovering circuit according to the first embodiment of the present invention will be described in detail.

Figure 1:
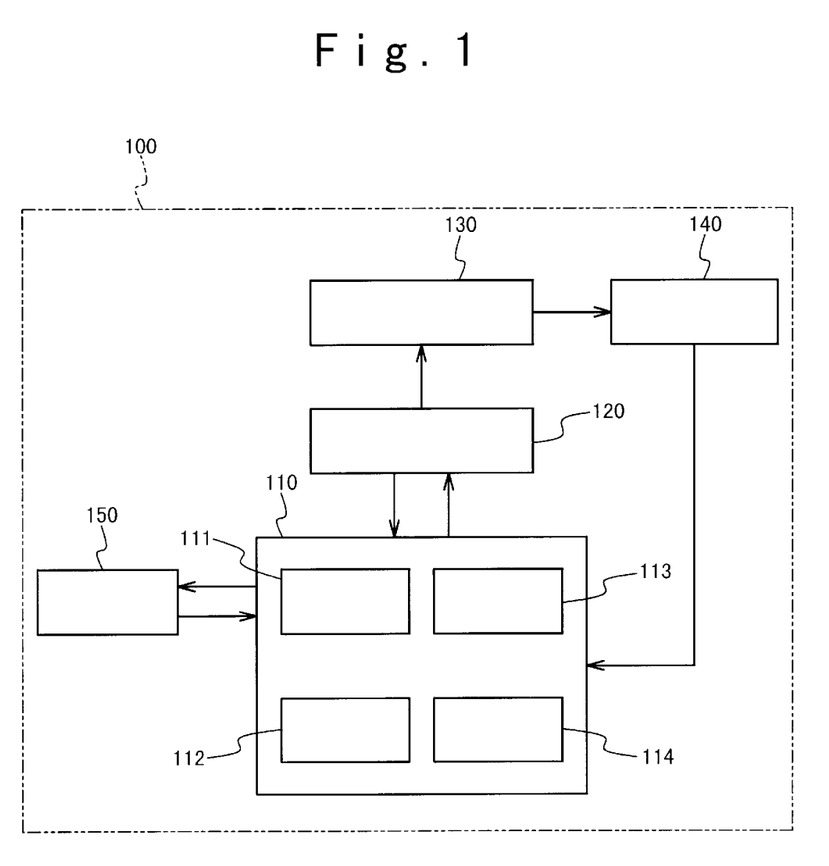
FIG. 1 shows a block diagram indicating an electric circuit according to the first embodiment of the present invention.

FIG. 1 shows a block diagram indicating the fault tolerant circuit according to the first embodiment of the present invention Shown in FIG. 1, the fault tolerant circuit 100 according to the first embodiment of the present invention includes a digital processing circuit 110, a fault diagnosis circuit 120, a function recovering circuit 130, an autonomous recovering data storing memory 140 and a data sheltering memory 150.

The digital processing circuit 110 is composed of a plurality of reorganization segments 111 to 114. Each of a plurality of the reorganization segments 111 to 114 is composed of at least one digital circuit block for operating original process functions. The digital circuit block is a general digital circuit or is a computer according to the first embodiment of the present invention.

The fault diagnosis circuit 120 detects whether or not the digital processing circuit 110 is failed. When the fault diagnosis circuit 120 detects that the digital processing circuit 110 is failed, the fault diagnosis circuit 120 identifies the failed part of a plurality of the reorganization segments 111 to 114. And then, the fault diagnosis circuit 120 directs the digital processing circuit 110 to separate the non-failed part of a plurality of the reorganization segments 111 to 114 other than the failed part of a plurality of the reorganization segments 111 to 114.

The function recovering circuit 130 minimizes the railed part of a plurality of the reorganization segments in which it should cut off based on the identification data in this fault occurrence detection data and at the trouble part occurred.

The function recovering circuit 130 decides the non-failed part of a plurality of the reorganization segments 111 to 114 which should be remained based on pre-determined priority levels of the functions The function recovering circuit 130 makes a function replay strategy for realizing the replay of the maximum function using the remaining part of a plurality of the reorganization segments 111 to 114. Here, the function replay strategy is composed of reorganization circuit data. The reorganization circuit data indicates the priority levels of the remaining part of a plurality of the reorganization segments, which is determined based on the functions of the priority levels. The reorganization circuit data further indicates that the digital processing circuit 110 realizes a maximum function replay using remaining circuit resources, that is the non-failed reorganization segments.

The autonomous recovering data storing memory 140 records the reorganization circuit data corresponding to the function replay strategy.

The data sheltering memory 150 temporally stores data indicative of the processing contents executed by the digital processing circuit 110 when the fault diagnosis circuit 120 detects that the digital processing circuit 110 is failed. The stored data is read out by the digital processing circuit 110 already reconstructed, and the reconstructed digital processing circuit 110 continues to execute the processing contents indicative of the stored data.

Here, in the fault tolerant circuit according to the present invention shown in FIG. 1, the digital processing circuit 110 is composed of four reorganization segments 111 to 114 But the digital processing circuit 110 in the fault tolerant circuit according to the present invention may be composed of a plurality of the reorganization segments 111 to 114 which is determined based on the scale of the digital processing circuit 110.

Also, in the fault tolerant circuit 100 according to the present invention, when the ratio of the circuit scale of the autonomous recovering data storing memory 140 to the whole fault tolerant circuit 100 is high, the reliability of the autonomous recovering data storing memory 140 is highly contributed to that of the whole fault tolerant circuit 100. In this case, the autonomous recovering data storing memory 140 can has a redundancy to preserve autonomous recovering data surely.

Moreover, the fault tolerant circuit 100 according to the present invention may have a redundancy, based on the ratio of the scale of below-described original process function parts of the fault tolerant circuit 100 to that of the below-described autonomous recovering function parts thereof. In this case, the fault tolerant circuit 100 may have the redundancy based on the method of the well-known anti-failed design.

Here, the original process function parts consist of the digital processing circuit 110, the fault diagnosis circuit 20, and the data sheltering memory 150 The autonomous recovering function parts consist of the function recovering circuit 130, and the autonomous recovering data storing memory 140.

Figure 2:
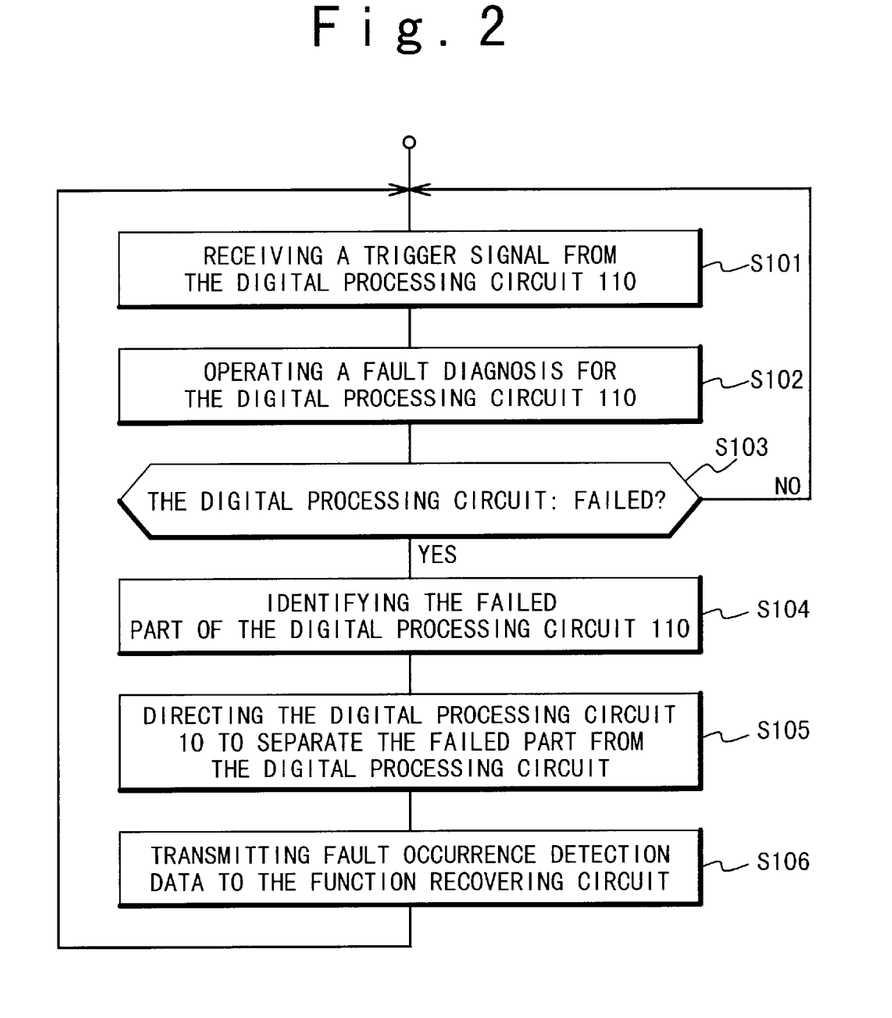
FIG. 2 is a flow chart showing the operation of the fault diagnosis circuit.
Figure 3:
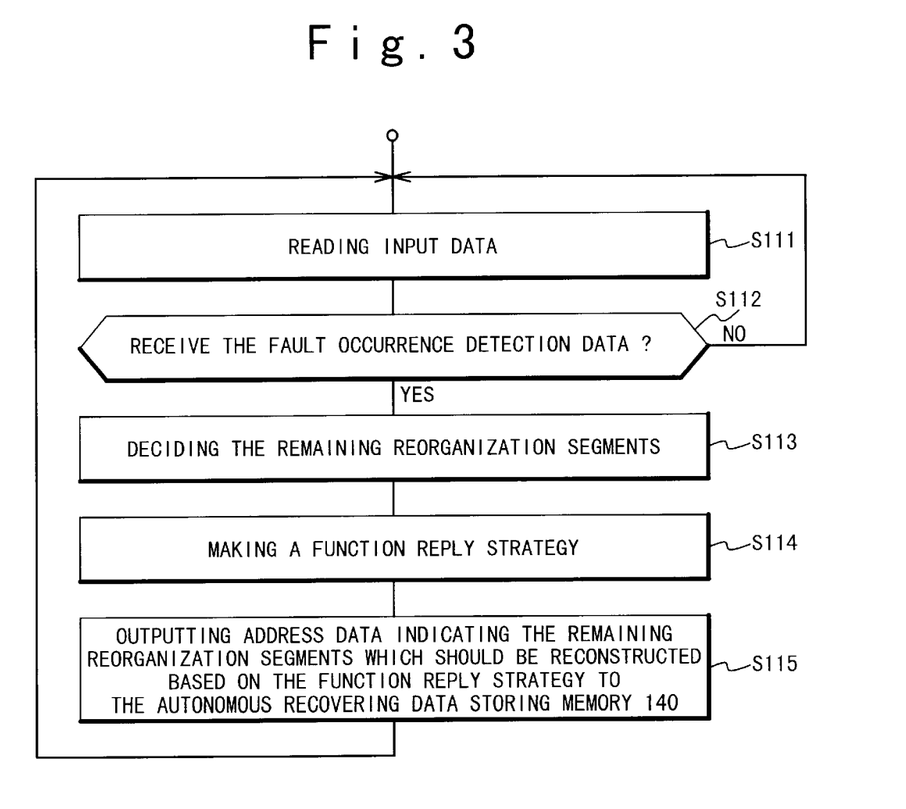
FIG. 3 is a flow chart showing the operation of the function recovering circuit.
Figure 4:
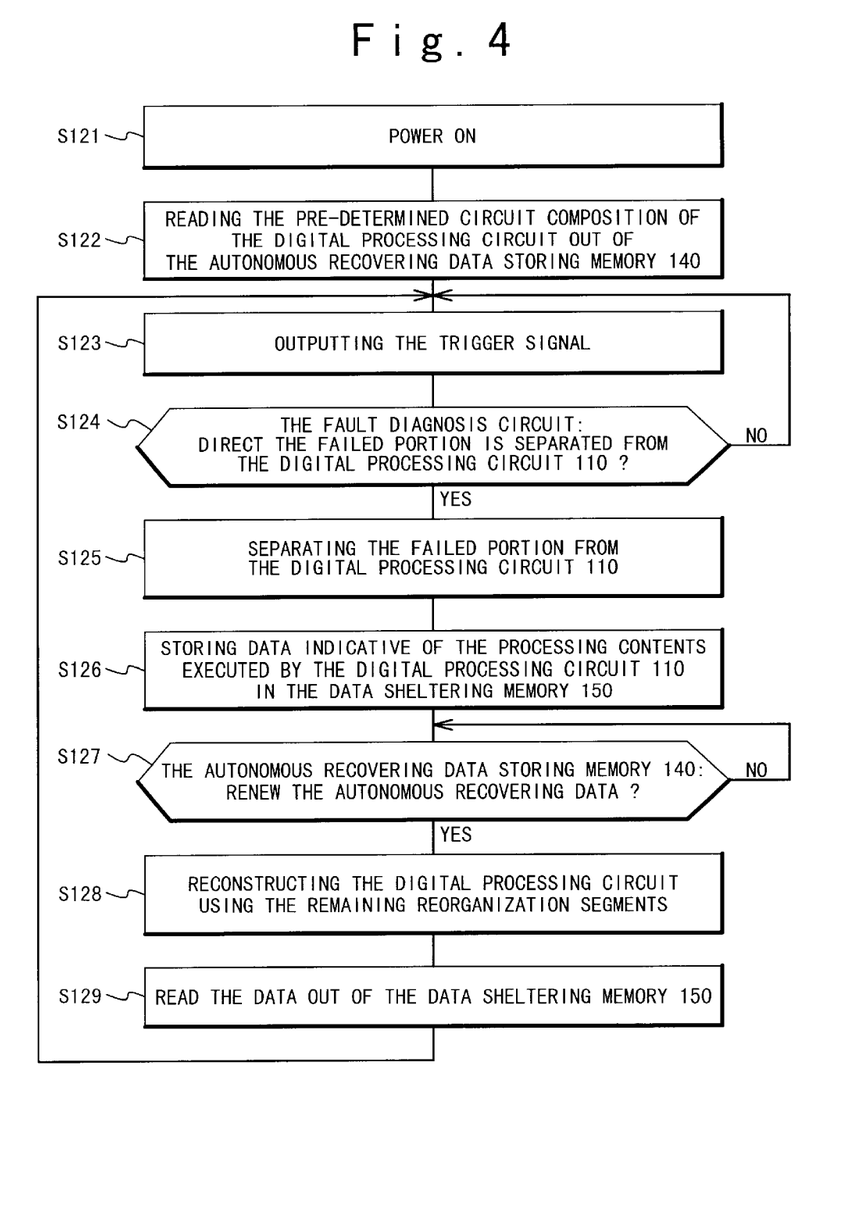
FIG. 4 is a flow chart showing the operation of the digital processing circuit.

Next, the operation of the fault tolerant circuit 100 according, to the present invention will be described below. FIG. 2 is a flow chart showing the operation of the fault diagnosis circuit 120. FIG. 3 is a flow chart showing the operation of the function recovering circuit 130. FIG. 4 is a flow chart showing the operation of the digital processing circuit 110.

The fault tolerant circuit 100 of the present invention has the function of recovering the digital processing circuit 110 autonomously. Referring to FIG. 4, the fault tolerant circuit 100 is turned on the power (at a step S121). And then, the digital processing circuit 110 reads a data indicating the pre-determined circuit composition of the digital processing circuit 110 out of the autonomous recovering data storing memory 140 (at a step S122). Then, the digital processing circuit 110 recognizes the circuit composition indicative of the retrieved data of the initialization and starts operating.

After that, referring to FIG. 2, the fault diagnosis circuit 120 continuously watches the operation of the digital processing circuit 110 (at a step S102) in response to a below-described trigger signal (at a step S101). Here the trigger signal is continuously generated by hardware (not shown in FIG. 1) incorporated in the digital processing circuit 110 or the software executed by the digital processing circuit 110. When the fault diagnosis circuit 120 detects that the digital processing circuit 110 is failed (at a step S103), the fault diagnosis circuit 120 identifies the failed part of a plurality of the reorganization segments 111 to 114 (at a step S104). And then, the fault diagnosis circuit 120 directs the digital processing circuit 110 to separate the failed part of a plurality of the reorganization segments 111 to 114 from the non-failed part of a plurality of the reorganization segments 111 to 114 other than the failed part of a plurality of the reorganization segments 111 to 114 (at a step S105).

When the fault diagnosis circuit 120 detects that the digital processing circuit 110 is failed, the fault diagnosis circuit 120 identifies the failed part of the digital processing circuit 110, which caused the trouble.

For example, the fault diagnosis circuit 120 identifies the reorganization segment 111 as the failed part of the digital processing circuit 110. In this case, the fault diagnosis circuit 120 transmits fault occurrence detection data indicating the reorganization segment 111 as the failed segment to the function recovering circuit 130 (at a step S106).

Referring to FIG. 3, the function recovering circuit 130 makes a function replay strategy (at a step S114) based on the fault occurrence detection data indicating the fault diagnosis circuit 120 (at a step S111, S112, S113).

Here, the function replay strategy is composed of reorganization circuit data. The reorganization circuit data indicates the priority levels of the remaining part of a plurality of the reorganization segments, which is determined based on the functions of the priority levels. The reorganization circuit data further Indicates that the digital processing circuit 110 realizes a maximum function replay using remaining circuit resources, that is the non-failed reorganization segments.

For example, the reorganization segment 112 has a higher order of the priority levels than the reorganization segment 113 and the reorganization segment 113 has a higher order of the priority levels than the reorganization segment 14. In this case, the reorganization segment 112 has a highest priority of the reorganization segments 112, 113, 114 and the reorganization segment 113 has a higher priority than the reorganization segment 114 according to the function replay strategy.

Moreover when the reorganization segments 112 to 114 are determined as the remaining circuit resources, the reorganization circuit data indicates the reorganization method of the reorganization segments 112 to 114 for digital processing circuit 110 to realize a maximum function replay.

The autonomous recovering data storing memory 140 stores the autonomous recovering data corresponding to the function replay strategy (at a step S115) and is taken the storing autonomous recovering data by the digital processing circuit 110. Here, the autonomous recovering data in this embodiment includes an address data indicating the remaining reorganization segments, which should be reconstructed, based on the function reply strategy.

Referring to FIG. 4 again, after executing the step S122, the digital processing circuit 110 generates the trigger signal and transmits the trigger signal to the fault diagnosis circuit 120 (at a step S123). When the digital processing circuit 110 is detected to be failed, the digital processing circuit 110 is directed by the fault diagnosis circuit 120 to separate the failed part of a plurality of the reorganization segments 111 to 114 from the non-failed part of a plurality of the reorganization segments 111 to 114 (at a step S124). And then, the digital processing circuit 110 electrically separates the non-failed reorganization segments (the reorganization segments 112 to 114 in this embodiment) according to the functions for preventing the propagation of the trouble to the non-failed reorganization segment (the reorganization segment 112 to 14) to the minimum (at a step S125).

The digital processing circuit 110 stores process data indicating the processing contents executed by the digital processing circuit 110 to the data sheltering memory 150 (at a step S126). And then, the digital processing circuit 110 reads the process data out of the data sheltering memory 150 when the autonomous recovering process is finished. Therefore, the digital processing circuit 110 can continue to execute processes.

After that, the digital processing circuit 110 reads the reorganization circuit data (indicative of the fault tolerant circuit data) which is generated based on the function replay strategy from the autonomous recovering data storing memory 140 (at a stop S127).

The digital processing circuit 110 selects one function in the order of the highest priority levels. The digital processing circuit 110 reconstructs itself using the reorganization segments such that the reconstructed digital processing circuit 110 can operate the selected function near the same as the digital processing circuit 110 with the pre-determined circuit composition operates the selected function (at a step S128).

In this case, the digital processing circuit 110 reconstructs itself by using the remaining circuit segments which is equivalent to the surplus circuit or the function part which it is possible to reduce. Here, the surplus circuit or the function part is included in the reorganization segments 111 to 114 of digital processing circuit 110.

As a result, the digital processing circuit 110 executes the autonomous recovering operation to recover closer functions which are operated by the digital processing circuit 110 with the pre-determined circuit composition.

When this autonomous recovering operation ends, the digital processing circuit 110 reads data stored in the data sheltering memory 150 and executes the processing indicative of the stored data continuously (at a step S129).

Here, depending on the troubled function, the digital processing circuit 110 can continue the processing using the part of a plurality of the reorganization segments, and execute the autonomous recovering operation in parallel. In this case, the digital processing circuit 110 executes the autonomous recovering operation with the failed part of a plurality of the reorganization segments and a part of a plurality of the non-failed reorganization segments arranged around the failed pert thereof. (In the fault tolerant circuit 100 according to this embodiment of the present invention, the fault diagnosis circuit 120 indicates the digital processing circuit 110 to continue the processing and stop that).

The fault tolerant circuit 100 according to this embodiment of the present invention has below-described effects as it affects the above-described implementation.

The fault tolerant circuit 100 according to this embodiment of the present invention does not only reconstruct the function by using the redundant composition in the system unit, but also reconstruct a replica for the function Of the high priority level in the system unit without using the redundant composition when the function is failed Therefore, the fault tolerant circuit 100 according to this embodiment of the present invention can utilize remaining non-failed reorganization segments effectively and finely.

Moreover, the fault tolerant circuit 100 according to this embodiment of the present invention can autonomously reconstruct functions in the nearer level for the pre-determined functions of the fault tolerant circuit 100.

Also, in the fault tolerant circuit 100 according to this embodiment of the present invention, the digital processing circuit 110 stores process data indicating the processing contents executed by the digital processing circuit 110 to the data sheltering memory 150. And then, the digital processing circuit 110 reads the process data out of the data sheltering memory 150 when the autonomous restoration processing is finished. Therefore, the digital processing circuit 110 can continue to execute processes.

The fault tolerant circuit 100 according to this embodiment of the present invention can realize the digital processing circuit with a higher trouble-proof and the compact hardware. This is because it can utilize effectively the remaining hardware resources and the hardware resources to lose by the trouble can be small.

Also, a fault tolerant circuit according to another embodiment of the present invention will be described.

The fault tolerant circuit 100 according to another embodiment of the present invention has the same composition as a fault tolerant circuit 100 according to the present invention referring to FIG. 1 Here, the autonomous recovering data storing memory 140 is remotely arranged from another sections of another fault tolerant circuit 100. The autonomous recovering data storing memory 140 is connected to the digital processing circuit 110 and the function recovering circuit 130 through the data network and the communication network. The autonomous recovering data storing memory 140 can remotely exchange the reorganization circuit data.

Also, a fault tolerant circuit according to still another embodiment of the present invention will be described. The fault tolerant circuit according to still another embodiment of the present invention may have the digital processing circuit 110 with a redundancy.

The fault tolerant circuit according to still another embodiment of the present invention is effective to execute the autonomous recovering operation of the troubled function part at the same time the processing, when the real time processing is requested to still another fault tolerant circuit according to the present invention.

Incidentally, the present invention is not limited to the above-described embodiments and the present invention can be applied to the ideal form.

Also, the number, the position, the shape of the above composition part can be made the number are not limited to the above-described embodiments and those of the above composition part can be made the number which is ideal, to do the situated ideal, an ideal shape, respectively.

Incidentally, as for each of FIGS. 1 to 4, identical components indicate identical marks, respectively.

The present invention can provide the fault tolerant circuit. The fault tolerant circuit autonomously detects that the circuit is failed. The fault tolerant circuit identifies a failed part of the circuit. The fault tolerant circuit separates only the failed part of the circuit from the non-falled part of the circuit. The fault tolerant circuit reconstructs the functions of the non-failed circuit segments, which were lost by separating the failed part of the circuit by using the non-failed part of the circuit.

Next, a fault tolerant circuit according to the second embodiment or the present invention will be described in detail.

Figure 5:
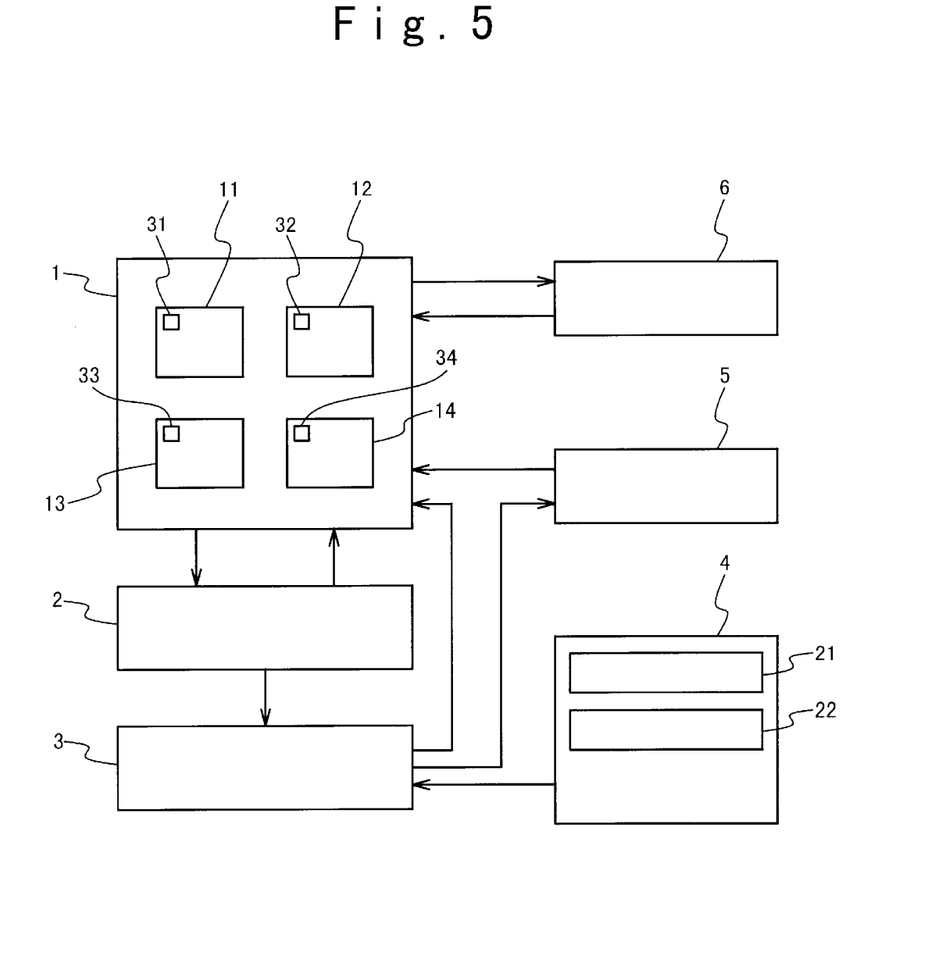
FIG. 5 shows a fault tolerant circuit according to the second embodiment of the present invention.

FIG. 5 shows the fault tolerant circuit according to the second embodiment of the present invention.

Referring to FIG. 5, the fault tolerant circuit according to the second embodiment of the present invention is provided with a circuit section 1, a fault monitoring circuit 2, a function reconstructing circuit 3, a first memory 4, a second memory 5 and a third memory 6.

The circuit section 1 executes pre-determined logic functions. The circuit section 1 includes a plurality of segments 11, 12, 13 and 14. The plurality of the segments 11, 12, 13 and 14 executes a corresponding one of the logic functions in response to a pre-determined command. The plurality of segments 11, 12, 13 and 14 have switching circuit 31, 32, 33 and 34, respectively. Each of the switching circuits 31, 32, 33 and 34 is controlled by the below-described fault monitoring circuit 2. While the switching circuits 31, 32, 33 and 34 are activated, the segments 11, 12, 13 and 14 are supplied with a clock signal and connected to the power supply, respectively. Therefore, the segments 11, 12, 13 and 14 operate while the switching circuit 31, 32, 33 33 and 34 are activated, respectively. Also, while each of the switching circuits 31, 32, 33 and 34 is inactivated, the switching circuit is not supplied with the clock signal and connected to the power supply. Therefore, the segments 11, 12, 13 and 14 do not operate while the corresponding switching circuits 31, 32, 33 and 34 are not activated.

Moreover, the circuit section 1 periodically generates the trigger signal and outputs the trigger signal to the fault monitoring circuit 2. Here, the circuit section 1 may execute a pre-determined algorithm to generate a trigger signal to the fault monitoring circuit 2.

The fault monitoring circuit 2 monitors the circuit section 1 in response to the reception of the trigger signal and detects whether or not the circuit section 1 is failed. Then, the fault monitoring circuit 2 determines which of the segments 11, 12, 13 and 14 is failed. At this time, the fault monitoring circuit 2 sends a notice indicative of failure occurrence in the circuit section 1 to the function reconstructing circuit 3. Also, the fault monitoring circuit 2 generates a control signal to control each of the switching circuit 31, 32, 33 and 34 to be selectively inactivated. As a result, ones of the segments 11 to 14 corresponding to the inactivated switching circuits stop the operations or functions.

Figure 6:
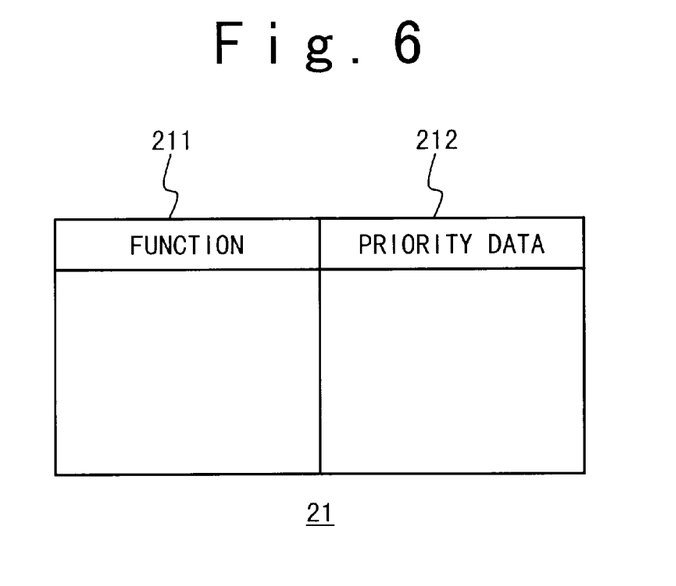
FIG. 6 indicates the structure of a priority data table.
Figure 7:
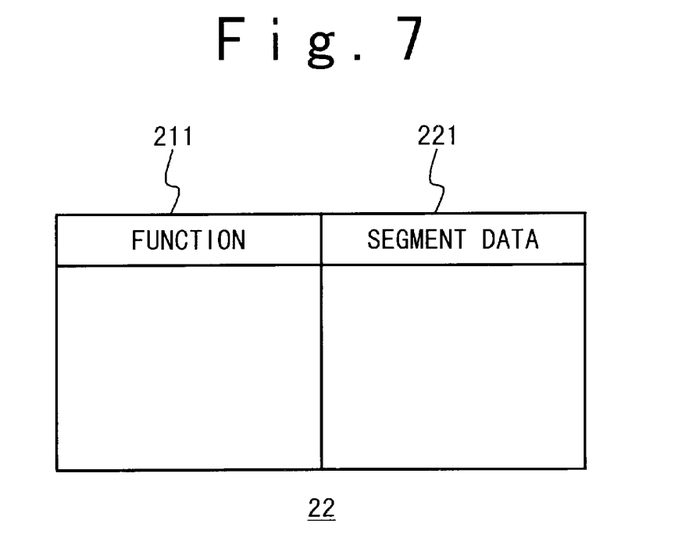
FIG. 7 indicates the structure of a segment table.

The first memory 4 stores a priority data table 21 and a segment table 22. Referring to FIG. 6, the priority data table 21 stores the plurality of functions 211 to be executed by the segments 11 to 14, and the priority levels 212 allocated to the segments 11 to 14. Referring to FIG. 7, the segment table 22 stores the plurality of functions 211 to be executed by the segments 11 to 14, and segment data 221 indicative of the each of the segments 11 to 14.

The function reconstructing circuit 3 refers to the priority data table 21 and the segment table 22 in response to the failure occurrence notice from the fault monitoring circuit 2 to retrieve the functions and priority levels of the non-failed segments. Then, the function reconstructing circuit 3 determines the electrical connection between the determined non-failed segments based on the retrieved functions and priority levels of the non-failed segments. Subsequently, the function reconstructing circuit 3 generates a reconstruction data indicative of the electrical connection between the non-failed segments. Thus, the function reconstructing circuit 3 writes the reconstruction data in the second memory 5. Thus, the electrical connections between the non-failed segments can be reconstructed based on the reconstruction data.

The third memory 6 temporarily stores operation data on the way of the operation for the functions executed by the segments when the fault monitoring circuit 2 detects that the circuit section 1 is failed.

Figure 8A:
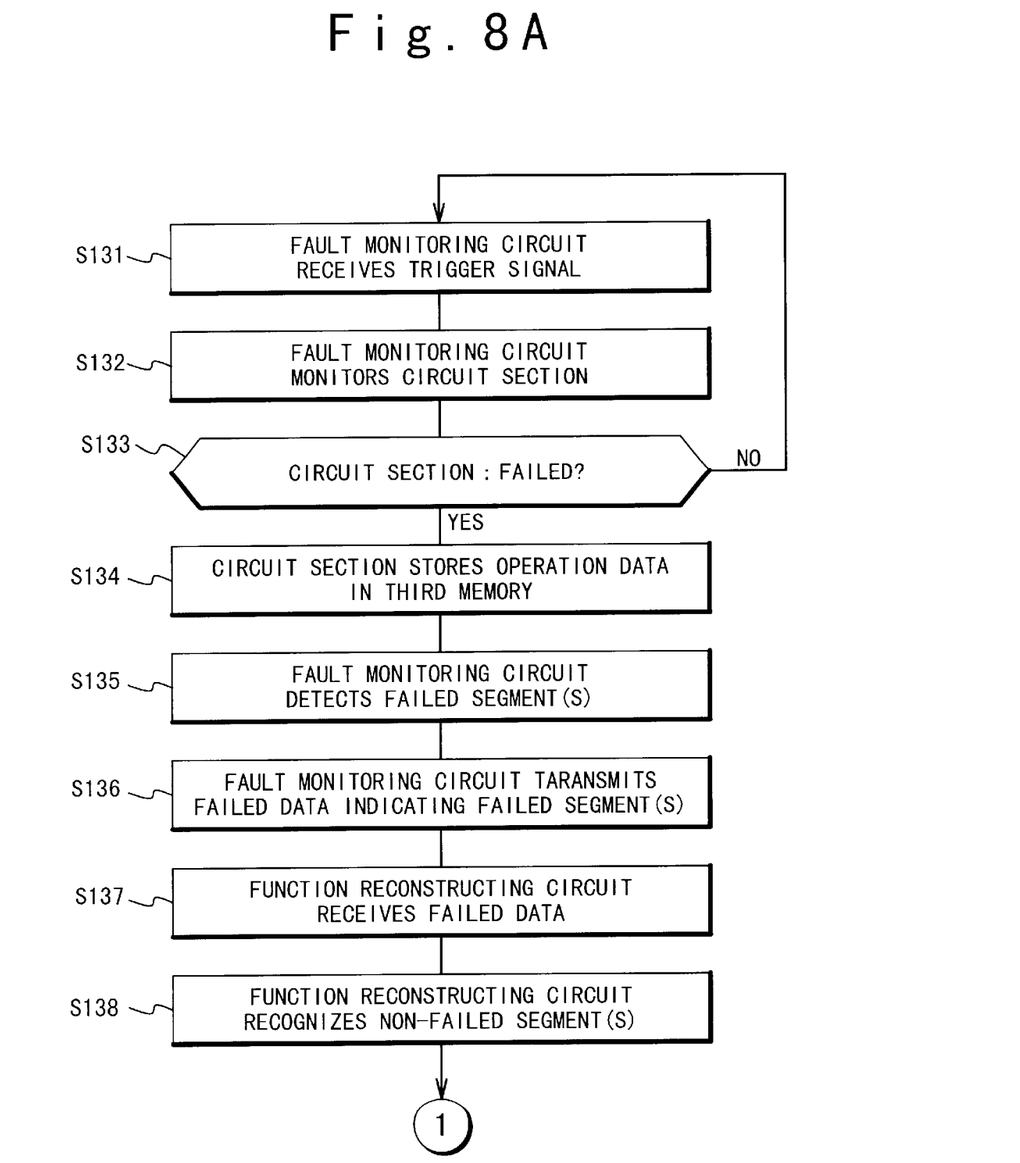
FIGS. 8A, 8B, and 8C are a flowchart representing the operations of the fault tolerant circuit according to the second embodiment of the present invention.
Figure 8B:
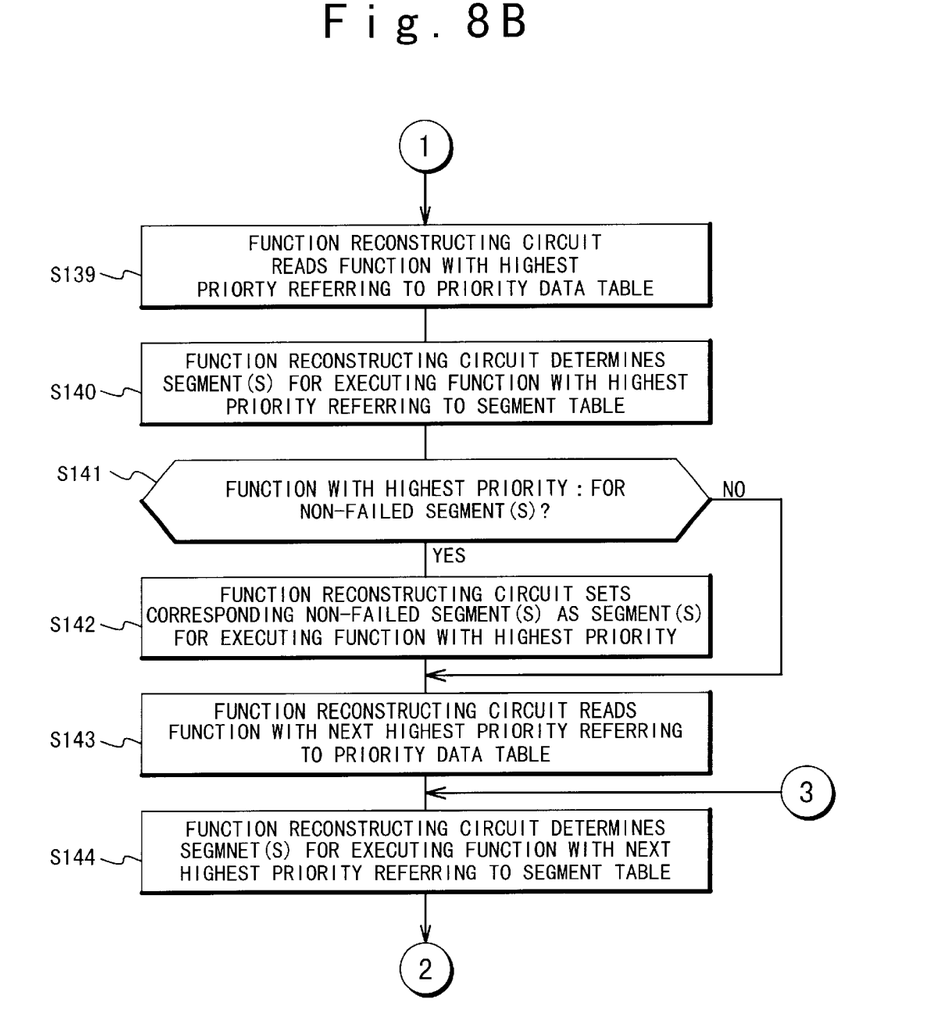
Figure 8C:
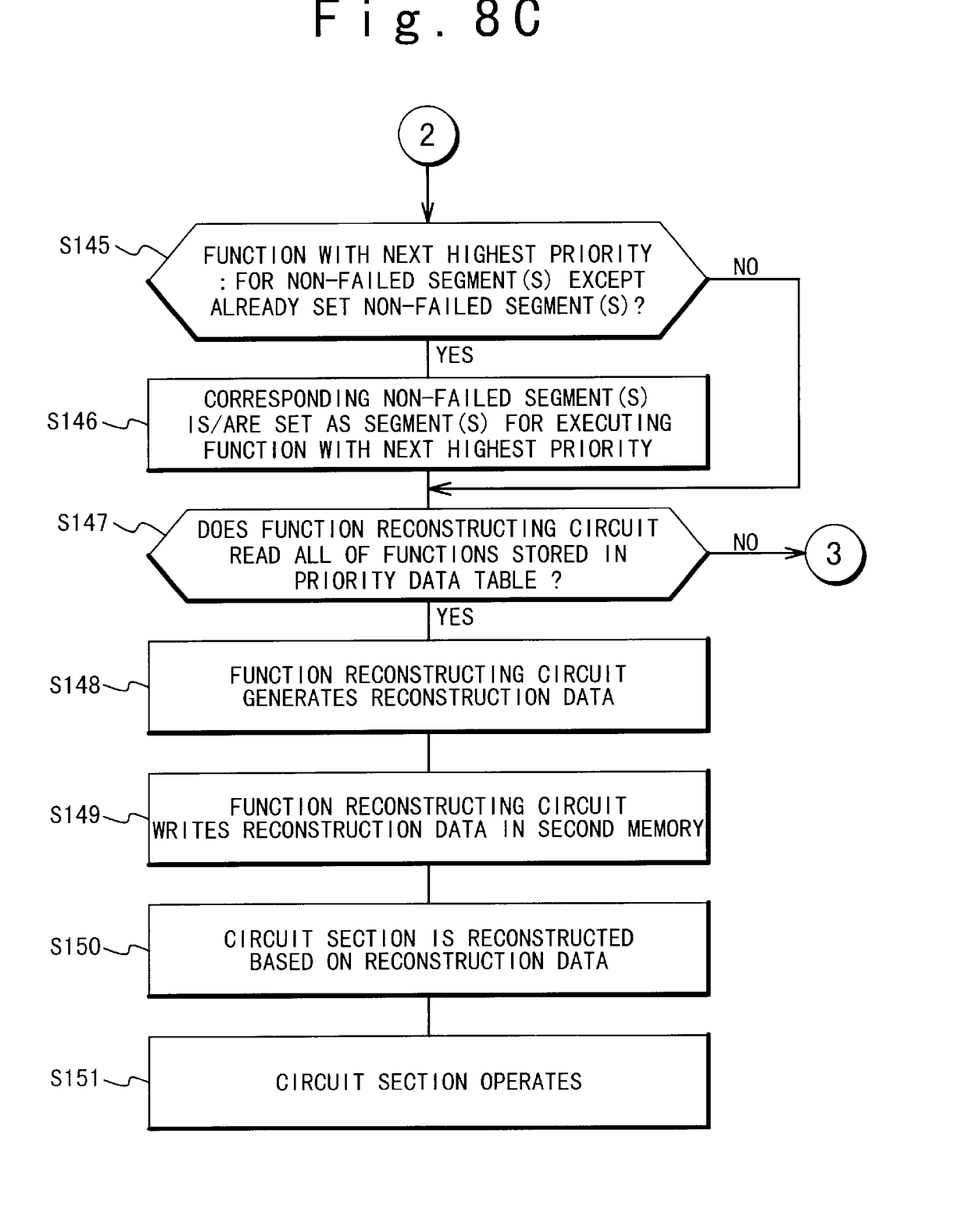

Next, the operation of the fault tolerant circuit according to the second embodiment of the present invention will be described below. FIGS. 8A, 8B, and 8C are a flowchart representing the operation of the fault tolerant circuit according to the present invention.

Referring to FIGS. 8A, 8B, and 8C, at a step S131, the fault monitoring circuit 2 receives a trigger signal from the circuit section 1. At a step S132, the fault monitoring circuit 2 starts to monitor the circuit section 1 in response to the reception of the trigger signal.

At a step S133, the fault monitoring circuit 2 detects whether or not the circuit section 1 is failed. When the fault monitoring circuit 2 detects that the circuit section 1 is failed, a step S134 is executed. When the fault monitoring circuit 2 cannot detect the circuit section is failed, the step S131 is executed again At the step S134, the circuit section 1 stores operation data on the way of the operation corresponding to the functions executed by the circuit section 1 in the third memory 6. Then, at a step S135, the fault monitoring circuit 2 determines whether each of the segments 11, 12, 13 and 14 is a failed segment.

At a step S136, the fault monitoring circuit 2 transmits failed segment data indicative of the failed segment(s) determined at the stop S135, to the function reconstructing circuit 3. The function reconstructing circuit 3 receives the failed data indicating the failed segment data At a step S137, and recognizes non-failed segments in the circuit section 1 based on the received failed segment data at a step S138.

Then, at a step S139, the function reconstructing circuit 3 refers to the priority data table 21 to retrieve a function 211 with the highest priority level 212. At a step S140, the function reconstructing circuit 3 refers to the segment table 22 to retrieve segment data 221 corresponding to the function with the highest priority level. At a step S141, the function reconstructing circuit 3 determines whether the function with the highest priority level is for all the non-failed segments. When the function with the highest priority level is not for the non-falled segments, the control directly advances to a step S143. When the function with the highest priority level is for the non-failed segments, a step S142 is executed, and the function reconstructing circuit 3 sets the corresponding non-failed segments as the segments corresponding to the segment data 221. Then, at the step S143, the function reconstructing circuit 3 reads one 211 of the functions with next highest priority level by referring to the priority data 212 out of the priority data table 21. At a step S144, the function reconstructing circuit 3 determines the function with the next highest priority level by referring to the segment table 22. At a step S145, the function reconstructing circuit 3 determines whether the function with the next highest priority level is for all the non-falled segments except the ones already set. When the function with the next highest priority level is for the non-failed segments except the ones already set, a step S146 is executed. When the function with the next highest priority level is for the non-failed segments except-the-ones already set, a step S147 is executed. At the step S146, the function reconstructing circuit 3 sets the corresponding non-failed segments as the segments corresponding to the segment data 221.

At the step S147, the function reconstructing circuit 3 determines whether or not the function reconstructing circuit 3 reads out all of the functions 211 stored in the priority, data table 21. When the function reconstructing circuit 3 has already read all of functions 211 stored in the priority data table 21, a step S148 is executed. When the function reconstructing circuit 3 has not read all of the functions 211 stored in the priority data table 21, the step S144 is executed.

At the step S148, the function reconstructing circuit 3 generates a reconstruction data indicating electrical reconnection between the non-failed segments based on the set non-failed segments. At a step S149, the function reconstructing circuit 3 stores the reconstruction data in the second memory 5 At a step S150, the circuit section 1 is reconstructed based on the reconstruction data. That is, the connection between the non-falled segments is changed in the circuit section 1 based on the reconstruction data. At a step S151, the reconstructed circuit section 1 reads the operation data which has been previously stored in the third memory 6, and restarts the operation based on the read out operation data. In this way, a part of the functions stored in the priority data table 21 can be re-executed by the circuit section 1.

What is claimed is:

1. A fault tolerant circuit comprising:
   a circuit section having a plurality of circuit sections provided to execute a plurality of functions, wherein each of said plurality of functions has a pre-determined priority level;
   a detecting circuit detecting whether or not a part of said plurality of circuit sections is failed; and
   a reconstructing circuit reconstructing a remaining part of said circuit section other than said failed part of said plurality of circuit sections to execute only a part of said plurality of functions which is selected based on said pre-determined priority levels when said detecting circuit detects that said part of the plurality of circuit sections is failed.

2. A fault tolerant circuit according to claim 1, wherein said plurality of circuit sections are electrically connected, and
   wherein said reconstructing circuit changes said electrical connections between said remaining part of said circuit section other than said failed part of said plurality of circuit sections to execute said part of said plurality of functions selected based on said pre-determined priority levels when said detecting circuit detects that said part of the plurality of circuit sections is failed.

3. A fault tolerant circuit according to claim 2, wherein said detecting circuit electrically separates said failed part of said plurality of circuit sections from a remaining part of said circuit section other than said failed part of said plurality of circuit sections.

4. A fault tolerant circuit according to claim 1, further comprising:
   a memory storing a plurality of function data and a plurality of segment data, wherein each of said plurality of function data corresponds to one of said plurality of functions and each of said plurality of segment data indicates a part of said plurality of circuit sections which are needed for executing said corresponding function, and
   wherein said reconstructing circuit refers to said memory to retrieve said plurality of function data and said plurality of segment data, when said detecting circuit detects that said part of the plurality of circuit sections is failed, and reconstructs said remaining part of said circuit section other than said failed part of said plurality of circuit sections based on said plurality of retrieved function data and said plurality of retrieved segment data, to execute said part of said plurality of functions which is selected based on said pre-determined priority levels.

5. A fault tolerant circuit according to claim 1, wherein said each of plurality of circuit sections includes a switching portion for controlling said corresponding circuit section to supply voltage, and said detecting circuit controls said switching portions of said failed part of said plurality of circuit sections to stop supplying the voltage.

6. A fault tolerant circuit according to claim 1, wherein said each of plurality of circuit sections includes a switching portion for controlling said corresponding circuit section to supply clock signals for operating said corresponding circuit section, and said detecting circuit controls said switching portions of said failed part of said plurality of circuit sections to stop supplying the clock signals.

7. A fault tolerant circuit according to claim 1, further comprising:
   a memory; and wherein said circuit section stores in said memory a executed function executed by said circuit section when said detecting circuit detects that said part of the plurality of circuit sections is failed, and
   wherein said circuit section takes said executed function out of said memory and executes said executed function when said reconstructing circuit controls a remaining part of said circuit section other than said failed part of said plurality of circuit sections to execute a part of said plurality of functions selected based on said pre-determined priorities.

8. An autonomous recovery method for a fault tolerant circuit including a circuit section having a plurality of circuit segments provided to execute a plurality of functions, comprising:

(a) determining a priority to each of said plurality of functions;

(b) detecting whether or not a part of said plurality of circuit sections is failed; and (c) reconstructing a remaining part of said circuit section other than said failed part of said plurality of circuit sections to execute only a part of said plurality of functions which is selected based on pre-determined priorities, when said (b) detecting detects that said part of the plurality of circuit sections is failed.

9. An autonomous recovery method according to claim 8, wherein said plurality of circuit sections are electrically connected, and wherein said (c) controlling changes said electrical connections between said remaining part of said circuit section other than said failed part of said plurality of circuit sections to execute a part of said plurality of functions selected based on said pre-determined priorities by when said (b) detecting detects that said part of the plurality of circuit sections is failed.

10. An autonomous recovery method according to claim 9, wherein said (c) controlling includes;

(g) separating electrically said failed part of said plurality of circuit sections from a remaining part of said circuit section other than said failed part of said plurality of circuit sections.

11. An autonomous recovery method according to claim 8, further comprising:

(d) setting a plurality of segment data corresponding each of said plurality of functions wherein each of said plurality of segment data indicates segments needed for executing said corresponding function, and wherein said (c) controlling controls remaining part of said circuit section other than said failed part of said plurality of circuit sections to execute a part of said plurality of functions selected based on said pre-determined priorities referring said plurality of segment data when said detecting circuit detects that said part of the plurality of circuit sections is failed.

12. An autonomous recovery method according to claim 8, wherein said each of plurality of circuit sections includes a switching portion for controlling said corresponding circuit section to supply voltage, further comprising, (e) controlling said switching portions of said failed part of said plurality of circuit sections to stop supplying the voltage.

13. An autonomous recovery method according to claim 8, wherein said each of plurality of circuit sections includes a switching portion for controlling said corresponding circuit section to supply clock signals for operating said corresponding circuit section, further comprising, (f) controlling said switching portions of said failed part of said plurality of circuit sections to stop supplying the clock signals.

14. An autonomous recovery method according to claim 8, further comprising, (h) taking a executed function executed by said circuit section when said (b) detecting detects that said part of the plurality of circuit sections is failed, and (i) executing said executed function by said circuit section after said (c) controlling is executed.

* * * * *